June 4, 1929.  G. CHRISTENSON  1,715,406
PACKING FOR AIR BRAKE CYLINDERS AND THE LIKE
Filed July 30, 1926
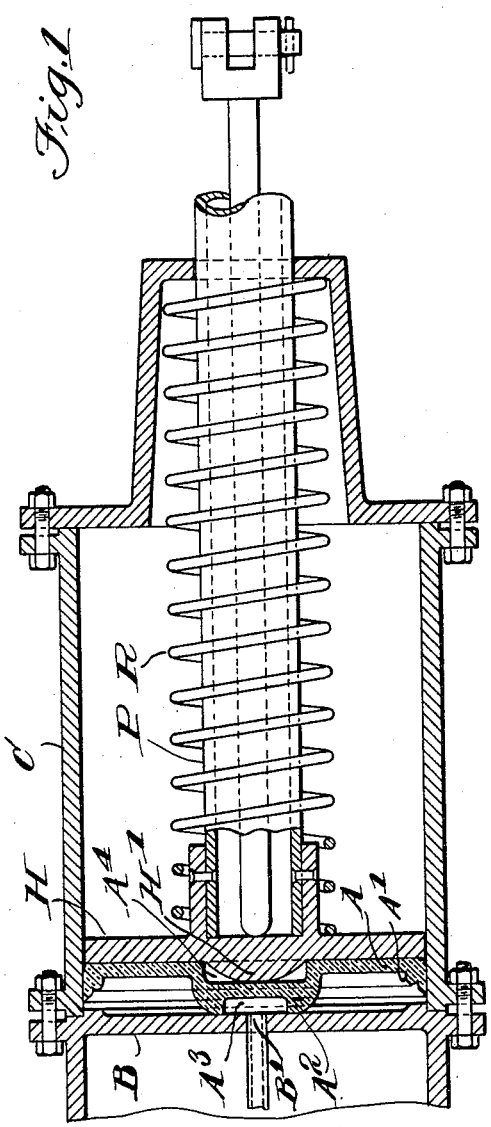
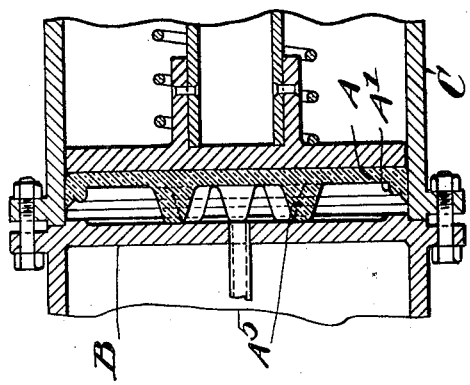
Inventor
George Christenson,
by Roberts, Cushman & Woodberry.
Att'ys Patented June 4, 1929.

1,715,406

UNITED STATES PATENT OFFICE.

GEORGE CHRISTENSON, OF NORTH PLAINFIELD, NEW JERSEY, ASSIGNOR, BY MESNE ASSIGNMENTS, TO JOHNS-MANVILLE CORPORATION, OF NEW YORK, N. Y., A CORPORATION OF NEW YORK.

PACKING FOR AIR-BRAKE CYLINDERS AND THE LIKE.

Application filed July 30, 1926. Serial No. 125,927.

My invention relates to piston packings, and particularly packings for air brake cylinders which, with respect to the actuating fluid under pressure are single-acting. The principal objects to which my invention is directed are: elimination of leakage, simplification of structure, ease of replacement and repair. Subsidiary objects and advantages will appear from the following description.

In the drawings hereto annexed, which depict a structure exemplifying my invention, as applied to an air brake cylinder, Figure 1 shows, in axial mid-section, portions of an air brake cylinder, with its piston, piston rod, and release-spring, and Figure 2 shows, in mid-section, a modified form of packing cup, and its relationship to other parts of the brake-apparatus.

Referring to the drawings, C, (Fig. 1) represents the cylinder in which the brake actuating piston H, with its rod P, works to apply the brakes when air under pressure is admitted at the intake B'. B constitutes the head of cylinder C. R represents the usual release-spring, which acts to return the piston H to its brake-release position when the air pressure is released.

I eliminate the follower plate and its holding studs, which heretofore have been associated with and carried by the air brake piston, and also, instead of the annular packing ring which has been used, confined between the piston and follower-plate, and through which, by the necessities of construction, the holding studs for the follower plate have passed, I employ a packing cup such as A, which is an imperforate disc of suitable packing material, and merely rests on the piston H, without any mechanical fastening members. This packing cup A is preferably provided with an upturned cylindrical packing lip A' having the characteristics of the lip shown and described in my United States Letters Patent No. 1,273,736, dated July 23, 1918; and the material of which I prefer to form the said packing cup A is that described in the said patent.

In order to permit the pressure retaining peripheral lip A' from being crushed or crippled by coming into contact with the cylinder head B, the packing cup A has an upwardly projecting boss $A^2$ molded on it, of such proportions that it serves as a stop to upward movement of the piston H when the release spring R moves the latter to brake-release position, the boss $A^2$ coming into contact with the cylinder head B and being compressed by the force exerted by spring R to a degree sufficient to balance the spring pressure and arrest movement of the piston H before the latter has moved far enough to make contact between the lip A' and the cylinder head B and thus while clearance remains between the said lip and the head B.

If the form of packing cup shown in Fig. 1 (which is the form which I prefer) be used, the guard-boss $A^2$ is provided with a recess $A^3$ which, registering with the air intake aperture B' provides ample area on which the air pressure may act to impart initial brake-setting movement to the piston H. This packing cup A (Figs. 1 and 2) is provided also with a central recess $A^4$, approximately cylindrical in shape, which, in relation to the piston boss H' provides not only clearance allowing the packing cup to make surface contact with the piston outside the said boss H' but also a space with walls adapted to afford a hold for a hook or other tool when it becomes necessary to remove the cup A from the cylinder C.

In Fig. 2 the packing cup A is shown as provided with a number of guard-studs $A^5$, perferably molded integrally with the cup, arranged in a circle with spaces between adjacent studs. These are of such height that they perform the lip-protecting function in a manner which makes them equivalent to the guard-boss A', shown in Figs. 1 and 2.

It will now be obvious that the packing cup above described, when assembled with the members associated with it, presents a continuous imperforate barrier against all leakage, the lip A', in contact with the cylinder wall providing a practically effective closure against leakage of pressure by the lip of the packing.

I claim:

1. The combination with a piston, cylinder, cylinder head provided with a central intake for fluid under pressure, a release-spring to return the piston to head-end position, of a piston-packing cup consisting of an imperforate disc of flexible material having a peripheral upstanding lip for packing contact with the cylinder wall, and a central projecting elastic guard-boss, adapted to contact with the cylinder head and arrest movement of the piston in response to spring-pressure while clearance remains between the cylinder head and the said peripheral lip, said guard-boss recessed to provide area therein for the exertion of pressure by fluid entering through the intake.

2. The combination with a piston, cylinder, cylinder head provided with a central intake for fluid under pressure, a release-spring to return the piston to head-end position, of a piston-packing cup consisting of an imperforate disc of flexible material having a peripheral upstanding lip for packing contact with the cylinder wall, and a central projecting guard-boss, adapted to contact with the cylinder head and arrest movement of the piston in response to spring-pressure while clearance remains between the cylinder head and the said peripheral lip, said guard-boss recessed to provide area therein for the exertion of pressure by fluid entering through the intake, said disc being also provided with a central recess adapted to provide air space between said disc and the piston.

3. A unitary packing cup for attachment to the head of a piston, comprising an imperforate disk of flexible, somewhat yieldable material, an integrally moulded upstanding peripheral lip upon said disk, and an integrally moulded guard projecting upwardly from the central portion of the disk, said guard having a greater height than said lip and being similarly formed of yieldable material whereby it may form a cushion between the piston and cylinder head at the end of the piston stroke and may protect the lip against engagement with the cylinder head.

Signed by me at New York, New York, this twenty-fourth day of July, 1926.

GEORGE CHRISTENSON.